United States Patent [19]

Tollette

[11] 4,273,816
[45] Jun. 16, 1981

[54] FOAM BASED STRUCTURE

[75] Inventor: Henry B. Tollette, Sacramento, Calif.

[73] Assignee: Custom Made Packaging Inc., Sacramento, Calif.

[21] Appl. No.: 61,801

[22] Filed: Jul. 30, 1979

[51] Int. Cl.³ .......................... B32B 1/02; B32B 5/18; B32B 7/06; B32B 7/10
[52] U.S. Cl. ...................................... 428/35; 40/2 R; 40/615; 156/239; 156/249; 156/256; 156/277; 428/40; 428/202; 428/204; 428/211; 428/213; 428/215; 428/315; 428/354; 428/80; 428/310; 428/314; 156/60; 156/250
[58] Field of Search ................ 40/2 R, 310, 324, 594, 40/615; 156/239, 240, 249, 256, 277; 428/40, 35, 202, 203, 204, 213, 211, 215, 315, 314, 354, 914

[56] References Cited

U.S. PATENT DOCUMENTS

| | | | |
|---|---|---|---|
| 3,262,827 | 7/1966 | Kallander et al. | 428/425 |
| 3,494,059 | 2/1970 | Minasian | 428/40 |
| 3,674,622 | 7/1972 | Plasse | 428/315 |
| 3,995,087 | 11/1976 | Desanzo | 428/40 |

FOREIGN PATENT DOCUMENTS 105886  7/1974  Japan ...................................... 428/315

Primary Examiner—William J. Van Balen
Attorney, Agent, or Firm—Mark C. Jacobs

[57] ABSTRACT

A label for application to containers to be shipped under bottle-to-bottle contact conditions comprising a laminate structure of superposed layers of transparent film printed with indicia on the underside thereof, and adhered to an intermediate paper layer, said paper layer being adhered on its underside to a foam layer.

The process for making the laminate is also disclosed.

20 Claims, 5 Drawing Figures

FOAM BASED STRUCTURE

BACKGROUND OF THE INVENTION

Bulk packaging of glass and plastic bottles is not new. Innovative approaches for shipment of containers has increased its utilization recently.

Bulk packaging works best for cylindrical containers. Odd shapes such as decanters do not have sufficient stability to enable them to be shipped in this manner.

The surface condition of glass is extremely important in high-speed bulk and partitionless packaging systems. Due to the crystalline nature of raw glass, abrasion will occur whenever two such surfaces come into contact. Scratches caused by abrasion establish stress concentration points and can reduce container strength. Surface treatments to provide both abrasion protection and lubricity are a must for glass-to-glass contact.

This surface protection problem also arises when glass contacts metal components on high-speed handling and filling machinery.

In addition plastic containers are subject to scratching which can affect their cosmetic appearance thusly rendering them less attractive to consumer.

For those applications where regulations will not allow bottle-to-bottle packaging, alternatives have been developed.

One example is the junior partition. This partition is placed between the containers after they have been inserted in the shipping case. It extends toward the sidewall only far enough to pick up the two-point contact on the outer row of containers. It extends upward as far as the upper contact point on the packed containers. This reduction from the full width and height partitions most often encountered can provide for some material savings.

Another development that provides an alternative for those unable to ship in a glass-to-glass configuration is the container having a thin layer of polystyrene foam around the bottle to protect the sides. The foam thickness is sufficient to take the place of partitions in many cases. The container has obtained approvals from the railroads for shipment of several different sizes in partitionless containers for food and beverage items.

Soft drink bottlers are responsible for some of the developments in the glass-to-glass shipping concept.

One company that has pioneered the soft drink bottle covering and/or label is Owens-Illinois. Some of their patents known to the applicant include:
 Rhoades U.S. Pat. No. 4,038,446
 Karabedian U.S. Pat. No. 3,979,000
 Karabedian U.S. Pat. No. 4,071,597
 Rhoades U.S. Pat. No. 4,034,131

Indeed, there have been many different types of laminates provided for forming labels wherein a foam laminate would be provided with a pressure sensitive adhesive layer thereon normally having a backing sheet applied thereto. Printed data is applied to the face or top sheet of the laminate; the laminate is cut to desired label width, and provided to the user in suitable roll or other bulk form for removing the backing sheet material and applying the labels to the individual articles.

The big problem associated with all of the foam structures known here-to-fore, such as those recited above and in such other patents as Ryan U.S. Pat. No. 3,573,153 and Pesanzo U.S. Pat. No. 3,995,087 is the poor quality of the graphic material.

The general object of the present invention is to provide a novel and improved laminate for use in forming labels having high quality graphics.

Another object of the invention is to provide the label forming laminate comprising a transparent film top layer adapted to have printed data applied on the underside thereof, an intermediate paper layer to add body, and a foam layer being secured to the intermediate layer by an adhesive.

Yet another object of the invention is to provide a label forming laminate wherein the components thereof can be conventionally processed and laminated by existing apparatus and be easy to form, cut and use.

These and other objects and advantages of this invention will be made more apparent from a reading of the specification and the appended claims.

SUMMARY OF THE INVENTION

Figure 1:
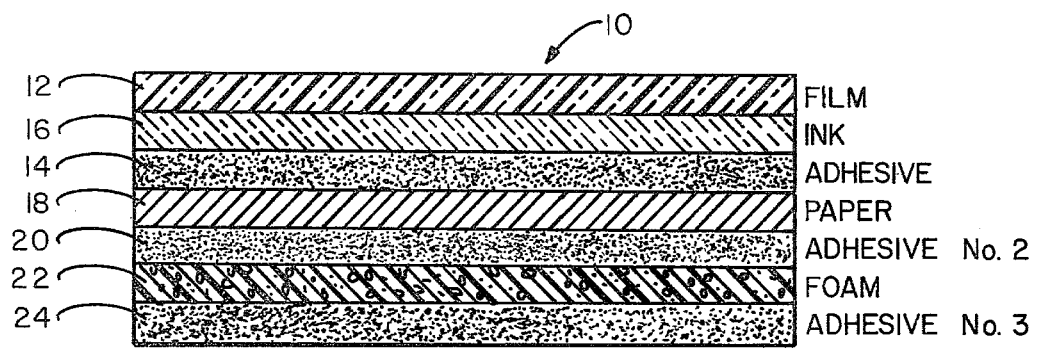
FIG. 1 is a schematic illustration showing a cross-section through the laminated structure of a label of this invention.

This invention provides a novel label for use on containers that are subjected to "glass-to-glass" packaging. That is, no corrugated board is used to separate one jar or bottle from those that are adjacent thereto. The label itself acts as a separator, to keep its container from contacting other containers adjacent thereto on the pallet or in the same shipping carton.

The label comprises a multi-layered structure comprising superposed layers of a film having bottom printed graphic indicia thereon, said film which indicia is readable through the film, being adhered to an intermediate paper layer. The paper in turn is adhered to a foam layer which serves to absorb the shock of impact of one container against another.

RELATIONSHIP TO OTHER COPENDING APPLICATIONS

In the copending application of Tollette, filed concurrently beneath, Ser. No. 061,662, filing date July 30, 1979, there was described a laminate comprising superposed layers of a transparent film adhered to an intermediate paper layer, said paper layer having graphic indicia on the top surface thereof, said paper being adhered on its underside to a foam layer. The laminate is used as a package structure or a label.

DESCRIPTION OF THE PREFERRED EMBODIMENT

Reference now is made to the accompanying drawing which shows a cross section through the laminate embodying the prinicples of the invention.

In the drawing, the various layers thereof are shown in exaggerated thicknesses since all of such layers normaly are in the vicinity or range of from about 0.00025 to about 0.25 inch in thickness. Corresponding numerals are used to refer to corresponding members or layers shown in the drawing and referred to in the specification to facilitate comparison therebetween.

The laminate of the main embodiment of the invention is indicated by the numeral 10. The laminate can be cut into individual labels and be processed for shipment to the end user for individual application of the labels to desired articles, by hand or machine.

The laminate 10 comprises a face or top layer of a tranparent, colored or colorless protective film. Typical among the films useable are case or biaxially oriented polypropylene, low and high density polyethylene, and coextrusions of films of polyethylene with other monomers, such as vinyl acetate, and coextrusions of two different densities of an olefin. Polyester films, e.g. mylar ® may also be employed. Such films are readily available in the marketplace from numerous suppliers. Other film forming materials include oriented polystyrene, cellulose films, such as cellophane and cellulose acetate, vinyl acetate, vinylidene chloride, vinyl chloride and copolymers thereof.

In some instances it may be necessary to treat certain films using techniques know in the art to accept printing ink.

In addition, it may be necessary to treat certain films, such as polyethylene, to accept hot melt adhesives.

Subsequent to the provision of indicia, such as words, pictures, symbols and the like printed, screened or otherwise applied to the underside of the film, to be described in detail below, the underside of this film is adhered to a paper layer. Details on inks suitable herein will be recited infra as well.

I have found that it is beneficial to utilize high wet strength paper. Typical of such paper is the 55 lb. paper made by Water Vliet Paper Company which has 150% wet strength of dry. The primary reason for preferring high wet strength paper over ordinary paper stock which, of course, is operable herein, in that when labels made from high wet strength paper are employed for beer or soft drink containers, the labels can be applied, prior to the marking of the outside of the bottle, which marking takes place either before or after filling. Thus it is seen that for non-liquid contents such as particulates wherein no washing step is employed, standard Kraft paper or label stock, as known in the industry may be employed. This last is especially useful in this invention, when a suitable colored transparent film is employed, due to its low price.

Optimally the paper may be treated for chemical resistance such as by the application of Scotchguard ® FC807 manufactured by the 3M Company.

Suitable paper weights range 45 lbs. (4 Mil) to 90 lbs. (9 mil) per ream.

In addition to standard paper or label stock, I have found that clay coated paper and other specialty papers used in label making can contribute to improved appearance of the laminates, when colorless film is employed. Mention may be made of metalized coated papers, which themselves are a laminate of very thin foil on one side of a strip of paper, available from such sources as King Seely, and Nicolet may be employed herein.

When choosing paper for use in the preparation of the intermediate layer of the laminates of this invention, the only important criteria to be considered in making the choice, are the compatibility with the adhesive, the film layer and the ink on said film. One readily recognizes that the film layer not only inhibits abrasion and tearing of the paper layer, but also inhibits solvent damage, such as water, to both the ink and the paper.

Obviously, those skilled in the art can choose the proper inks to be employed with any of these papers.

Details concerning the foam layer which is intended to absorb the shock of container upon container impact and its attachment to the paper layer's underside is also recited below.

Adhesive layer 14 which is applied to the underside of film layer 12 may be any suitable, preferably transparent in the dry state, adhesive. One such suitable class of adhesives are the urethanes such as Adcote 333 made by Morton Chemical Company. In addition, the adhesive must have no detrimental effect upon the ink used for the graphics on the underside of the film prior to its adhesion to the paper intermediate substrate 18. Also the Unoflex series of urethane adhesives made by Polymer Industries may be so employed. Other suitable products for adhesive 14 include the NCO-terminated polyesters of duPont and National Starch among others, and the thermoplastic acrylic adhesive resins sold by Stein Hall division of Cellanese Corporation, and by Rohm and Haas.

Inks employable in the manufacture of the laminates of this invention include any of the readily available pigmented and dye paper inks. One manufacturer of such products is I.P.I.

A second adhesive layer 20 is used to bond the paper to the foam. Due perhaps to the cellular nature of the foam, it has been noted that larger quantities of adhesive are required to bond the paper to the foam than in the previous film to paper bonding.

For adhesive layer 20, I may employ a urethane such as Adcote 333 or acrylic based adhesive such as those made by Pierce and Stevens, and Celanese.

Other adhesive resins known to the art such as polyamide and polystyrene and others known to the laminating art may be employed.

It is to be noted that for this bonding the requirement of translucency is not present. Thus any adhesive capable of binding foam to paper, which is not incompatible with either and which will not be readily dissolved by the contents of the container to which the laminate is applied, may be employed.

Obviously, layer 20 need not be transparent or translucent. The opacity, however, should not from an esthetic point of view overcome the generally white color of the foam such as to render the rear side of the laminate unpleasing, nor should the opacity be detrimental to the appearance from the front by contributing a coloration to the paper layer.

Turning now to the foam, it is seen that the foam should preferably be of a closed cell type. The layer of foam may conveniently vary in thickness between less than about 1/32nd to about 3/32nd inch thick. The cell size is not critical. Closed cell foams are not hygroscopic.

While a filled foam is operable, there is no reason to go to the expense to use filled foams when unfilled ones suffice.

Typical foam materials that are employable herein are polypropylene and polyethylene. In some instances the latter may require special treatment to be able to withstand the high temperatures of lamination, usually around 400°. Another foam that may be successfully employed is urethane foam, as sold by E. I. DuPont de Nemours under the trademark XC TM.

Still other cellular materials employable herein include polystyrene along or in combination with a copolymer of ethylene and vinyl acetate.

Details on the bonding of the foam to the paper are recited below.

The laminate 10 as described alone is ready for application to a container, unseen.

The laminate 10 is adhered to the container by the product packager.

The third adhesive layer, designated 24, which is applied to the laminate 10 by the ultimate user. Suitable adhesives include the so called semi-pressure sensitive hot melts such as those comprising ethylene vinyl acetate copolymer with a resinous tackifier as exemplified by National Starch's Product 344994. Other suppliers include Borden and Amsco.

Other types of adhesives that may be employed by the jar labeler include thermoplastic and thermosetting resinous composition both solvent based and water based, applied as liquids.

Layer 24 should be of a material that will not degrade the foam, nor contribute any type of displeasing esthetics to the completed label now mounted on a container.

Such adhesive layer 24 may be sprayed, brushed or otherwise applied as is known to the art.

Figure 2:
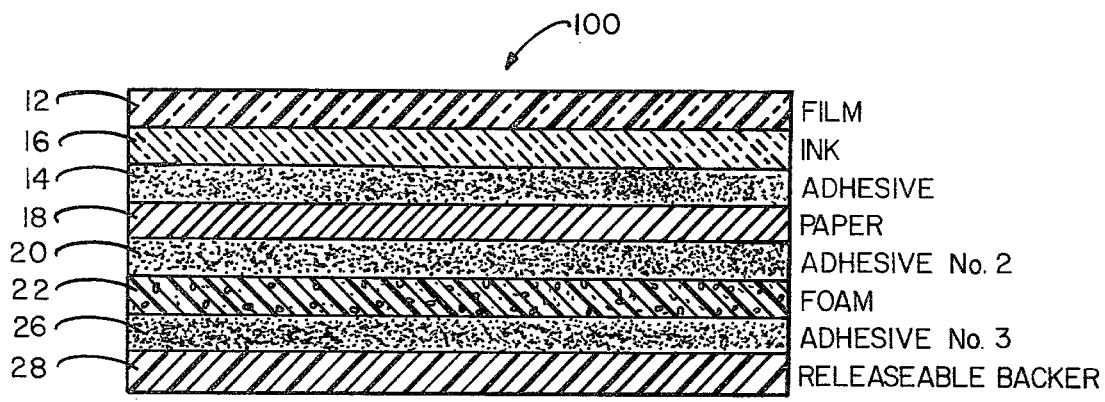
FIG. 2 is a similar view of an alternate embodiment.

An alternative means of applying the laminate to the container, is to employ the modified laminate 100 as shown in FIG. 2. In this embodiment, layers 12, 16, 14, 18, 20, and 22 are all as above. However, rather than applying adhesive 3 at the time of ultimate useage, adhesive 3 here designated as 26 is applied at the factory during the course of label manufacture and forms part of the laminate 100.

In this embodiment, the opposite face of the foam layer 22 has a layer 26 of a conventional pressure sensitive adhesive provided thereon and a releasable backing sheet 28 is attached to the remaining face or surface of the pressure sensitive adhesive layer 24. Obviously, such backing layer 28 is provided with a coating (not shown) of a release material on the surface thereof adjacent the pressure sensitive adhesive layer 26 whereby the backing layer can be released or disengaged from the adhesive layer 26 readily when desired. Any conventional release coating is provided on the backing layer 28 to contact the adhesive layer 26.

The backing sheet or layer 28 is usually a paper sheet and the release usually is a silicone composition.

PREPARATION OF THE LAMINATES

While there is no criticality assigned to the sequence of operations, I have found that the following procedure gives rise to satisfactory results.

A. Apply ink and graphic material to film substrate on the underside thereof.
B. Apply adhesive #1 to underside of film.
C. Bond inked film to paper surface under pressure.
D. Apply adhesive #2 to rear of paper.
E. Bond paper to foam under pressure.

Obviously adhesives #1 and #2 can be applied to either of the surfaces they are intended to adhere, not just the one recited above.

It is also to be understood that the use of pressure for bonding may require the application of some heat, but not enough to cause degradation of a substrate layer. It is within the skill of the art to choose the proper amount of heat to be applied.

The adhesion of paper to film is readily understood at the level of the state of the art today, and further details will not be recited.

For the foam to paper bonding, it is preferable to use a relatively larger quantity of adhesive than one would normally use in pressure bonding operations, coupled with a low pressure, on the order of less than 100 psi. In fact, good results have been obtained using 40 psi. Prior art bonding techniques employ about 1300 psi for foam to another substrate bonding. The use of excess adhesive with low pressure, ensures total coverage of the substrate by the adhesive, with the removal of any air gaps by the slight pressure. The technique ensures good bonds without fracturing of foam cells, or substantially diminishing foam thickness.

In order to ensure that excess space is not consumed on a shipping pallet or in a container, the labels of this invention are preferably not diecut in the manner of prior art labels. That is, one portion does not overlap another. For to do so would create a bulky label having two foam layers at the junction of the two label segments. Rather, the labels are cut with one end being convex, and one end being of a corresponding arc, but concave. When wrapped around a container, the convexity mates with the arc of the concavity to form a smooth butt end joint. Yet, at no point along the elevation of the label would an impinging article not contact a label portion. Therefore direct contact with the container at the slight space between abutting label portions is avoided.

The structure just described is intended for use primarily on glass or other breakable containers subject to impact. Such containers may be round or have a flat front and/or rear fare with curved sides such as those used for prescription liquids.

For container applications where container breakage is of a lesser hazard, standard square cut butt edge and even overlap seams may be employed. Such applications would include one portion servings of noodles and soup mix that require additon of water to the foam cup holding the contents.

it is seen that the foam portion of this label acts to retain heat or cold and to thereby provide insulation to the contents of the package. Such an application would be the noodle soup referred to above. Another application that would be a cold commodity would be an ice cream cup.

The following non-limiting examples illustrate laminates within the scope of the invention. In these examples, only the substrates are specifically recited, the lines representing the adhesives.

I
Polypropylene Film
Hi Wet Strength Paper
Polypropylene Foam
II
Low Density Polyethylene Film
Standard "Label" Paper
Polypropylene Foam
III
Polyester Film
Chemical Resistant Paper
Polypropylene Foam This is an excellent label for oil and chemical packages, example salad oil, or mayonaisse.

| IV |
| --- |
| Polyester Film |
| Foil Over Paper Laminate |
| Polyethylene Foam |

| V |
| --- |
| Low Density Polyethylene Film |
| High Wet Strength Kraft Paper |
| Polyethylene Foam |

This is a low price label suitable for bottled water.

| VI |
| --- |
| Oriented Polystyrene Film |
| High Wet Strength Kraft Paper |
| Polyethylene Foam |

This laminate is highly suitable for soft drink containers.

In all of the above laminates, the film is ink printed on the underside thereof.

While the thrust of this invention has been to disclose a label and the process for making same suitable for glass containers, obviously these labels can be used with plastic containers where there is risk of damage to the container or contents. Since these labels are of higher cost due to the plurality of manufacturing steps, one would not ordinarily use them if there were no need for the protection they afford. Thus it is seen that another excellent situation for their use is on ceramic collector-decorator whiskey bottles.

In addition to the above, the labels of this invention can be employed where insulation capability is desired separate from the problem of chemical degradation of the labels. Thus ice cream containers of card stock, metal, plastic or even glass can be covered in whole or in part with labels prepared according to this invention.

Figure 3:
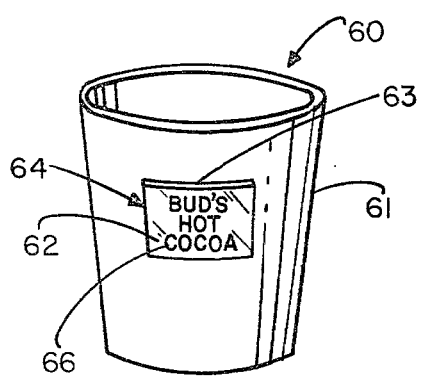
FIG. 3 is an elevational view of a device that incorporates a modification of the embodiment of FIG. 1.

In addition it is seen that foam based structures, such as styrofoam cup 61 of FIG. 3, can be prepared with an advertising message on the side thereof. The message 66 is reverse printed on the film 62, which is then laminated to a protective paper layer 63, yielding composite 64 which is then bonded to the foam cup 61 to yield an advertising specimen 60.

Figure 4:
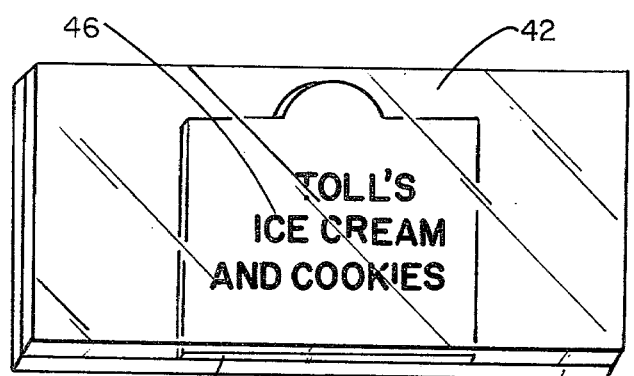
FIG. 4 is a schematic illustration showing a perspective view of another embodiment of the laminate of this invention.

It is seen therefore that the paper film composite 64 need not be coextensive in dimensions with the foam substrate.

it is also within the scope of the invention to have a portion of the film to be directly bonded to the foam to give a gloss finish to the foam, with the graphic containing paper being of smaller dimensions. Reference is made to FIG. 4.

FIG. 4 film 42 underprinted with message 46 thereon is seen to overlie paper layer 48. For ease of understanding no adhesive layers are specifically depicted in the figure. Layer 52 is the foam which is seen to be adhesed directly in part to film 42 and in part to paper 48. To avoid extra labor the use of one adhesive coating beneath the film capable of adhesion to both paper and foam is preferred. This coating should be preferably transparent.

Figure 5:
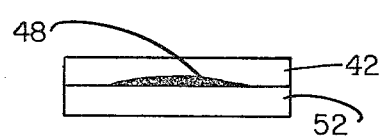
FIG. 5 is a front elevational cross-section of the embodiment of FIG. 4.

Since the thickness of the film is relatively small and flexible, there is little or no difficulty in trying to interpose the paper insert 48 at the location shown between the foam 52 and the film 42. See FIG. 5. Care should be taken, however, to avoid stretching of the film excessively, as this could tend to distort the graphic material.

In the manufacture of this embodiment, the paper would be preadhesed to the preprinted film and the foam 52 added thereafter. Normal lamination of normal adhesive—high pressure would be employed to secure the paper to the film. The composite of the film bearing the dimensionally smaller paper layer would be adhesed to the foam using a high adhesive content,—on the order of 4X normal adhesive and the previously discussed low pressure bonding technique to secure both the underside of the paper to the foam, and the surrounding film to the foam.

This order of process steps is deemed important, since an attempt to preadhese the paper to the foam, followed by normal high pressure laminating of film to paper may crush the foam cells, and because high-adhesive low pressure bonding of film to paper will yield bubbles in the film, not esthetically pleasing.

In this embodiment the invention is used for labeling as part of a structure rather than as a separate label. For example, utility would include a box for taco shells, or as shown here for ice cream sandwiches.

One big advantage of the label laminate of this invention is the fact that they can be readily printed with UPC, pharmaceutical and other bar type codes as used in various industries. Prior art foam based labels cannot support indicia that require precise recognition for machine reading capability.

Other than as indicated, any order of assembly of the three substrates may be employed. It is also seen that the dimensions of each layer need not be coextensive, as has been illustrated by the cup of FIG. 3 and the structure suitable for an ice cream container in the embodiment of FIG. 4.

The bonding of the film to the paper can be carried out using conventional technology and pressures of from about 20 to about 200 psi, even higher if the paper layer is a foil-paper laminate.

The bonding of the foam to the paper has been indicated to be also a low pressure lamination of under 100 psi. Pressures as low as 12 psi have been successfully employed. The important factor is not to crush the foam cells. Obviously, thinner foam cross-sections can withstand less pressure.

For the embodiment of FIG. 3, the standard mode of manufacture can be employed.

For the embodiment of FIG. 4, a uniform pressure may be applied to the film to adhese it to both the foam and the paper. The pressure being within the range of from about 21 to 100 psi.

Since certain changes may be made in the above apparatuses and processes without departing from the scope of the invention herein involved, it is intended therefore, that all matter contained in the above description shall be interpreted as illustrative and not in a limiting sense.

I claim:

1. A flexible laminate for labels and labeling comprising superposed layers of:
   (a) a transparent film having indicia printed on the underside thereof for viewing from above,
   (b) a paper layer having top and bottom surfaces,
   (c) a foam layer having a top and bottom surface,
   (d) layers of adhesive bonding said film to the top surface of said paper and the bottom surface of said paper to said foam's top surface.
2. A laminate for labels and labeling comprising:

a foam support having an obverse and reverse side and a layer of paper mounted on the obverse side of said support, and a film layer mounted on said paper said film layer having printed indicia on the underside thereof.

3. The laminate of claim 1 wherein the paper is a prelaminate of the metallic foil and paper.

4. The laminate of claim 1 wherein the length and width of each of the layers is the same.

5. The laminate of claim 2 wherein a pressure sensitive adhesive on a backing sheet is mounted on the reverse side of said foam support.

6. The laminate of claim 1 wherein the film is selected from the group consisting of polypropylene and polyethlene.

7. The laminate of claim 3 wherein the film is selected from the group consisting of vinyl chloride, vinylidene chloride and copolymers thereof.

8. The laminate of claim 1 wherein the foam layer is polypropylene.

9. The laminate of claim 2 wherein the foam support is polystyrene.

10. A flexible laminate for labels and labeling comprising:
(a) a reverse printed film layer bonded to a foam support;
(b) a printer paper layer having either or both of its length and width of dimensions smaller than the film layer interposed between said film and said foam, and bonded to said film and said foam.

11. The laminate of claim 1 wherein the film layer and paper layer are of substantially equal dimension.

12. A label of the laminate of claim 1 having a top and bottom edge and two side edges wherein one of said side edges is concave and the other is convex, the arc segment of each being the same.

13. The laminate of claim 6 further including a pressure sensitive adhesive on the underside of said foam and a backing sheet for said adhesive.

14. The laminate of claim 2 wherein the film and foam are each selected from the group consisting of polyethylene and polypropylene.

15. A process for the manufacture of flexible laminates for labels which comprises:
(a) bonding a printed film layer to a paper substrate with adeshive and pressure, and
(b) bonding the prelaminate of the previous step to a foam substrate using a high excess of adhesive and pressure of less than about 100 psi.

16. A process for the manufacture of laminates for labels and labeling which comprises:
(a) bonding a paper layer to foam substrate using a high excess of adhesive and pressure of less than about 100 psi, and
(b) bonding a reverse printed film to the paper layer under pressure insufficient to be deleterious to the cell structure of the foam.

17. A process for the manufacture of laminates for labels and labeling which comprises:
(a) adhesively bonding one side of paper layer to a reverse printed film substrate under high pressure, wherein said paper is dimensioned smaller than said film, bonding said film and the second side of the paper to a foam substrate.

18. The process of claim 15 further including the steps of cutting the one side of the laminate concave and the other side convex with the arc segment of each being the same.

19. The process of claim 16 further including the steps of cutting the one side of the laminate concave and the other side convex with the arc segment of each being the same.

20. A container having a printed indicia thereon comprising a foam container, having a layer of paper adhered to said foam container, and a layer of reverse printed film adhesed at least to said paper.

* * * * *